July 26, 1932.  L. W. McCULLOUGH  1,868,710
CURRENT CONTROLLING OR REGULATING DEVICE
Filed Aug. 2, 1929  2 Sheets-Sheet 1
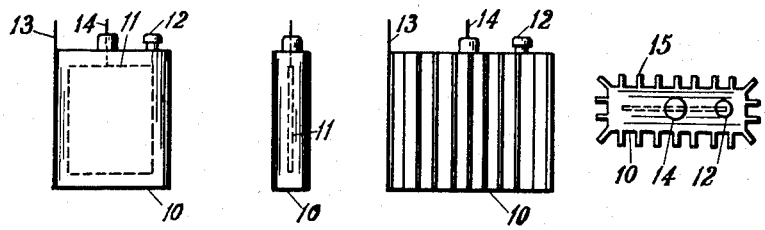
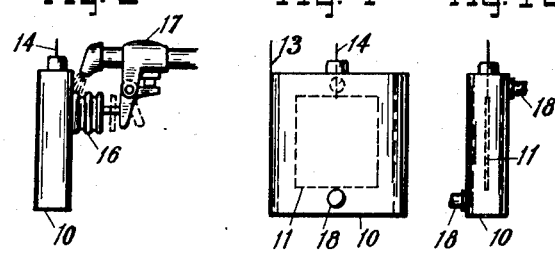
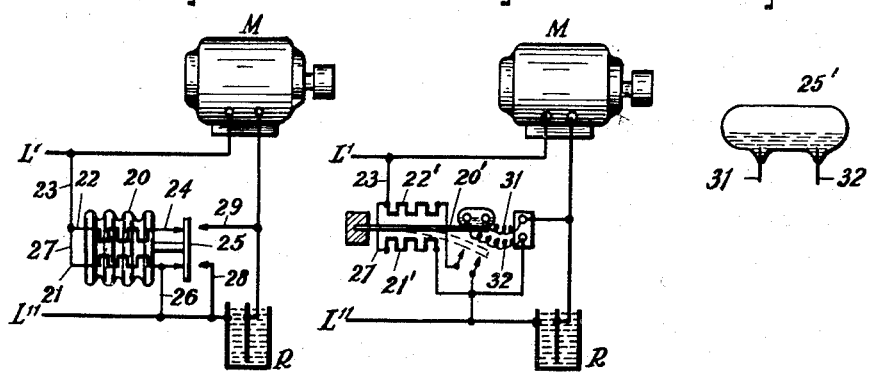
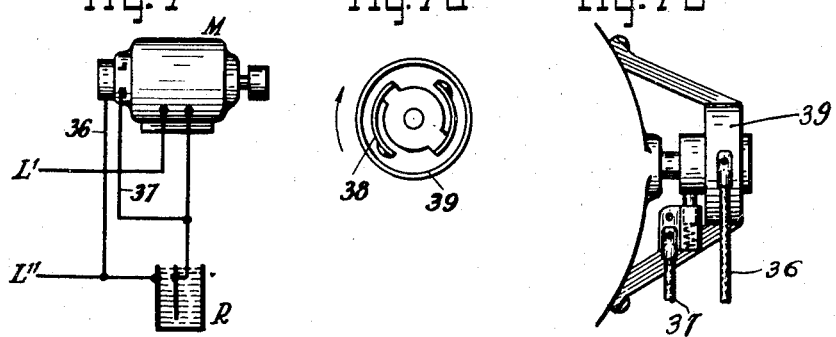
INVENTOR
Lee W. McCullough.
BY
John M. Cole.
ATTORNEY

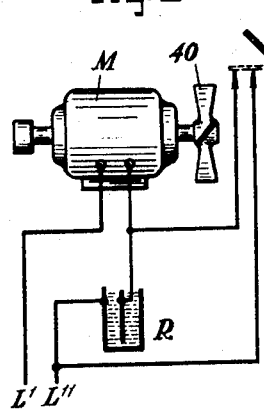
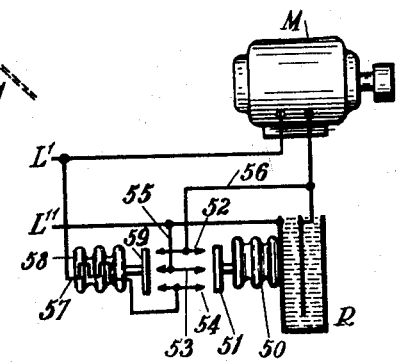
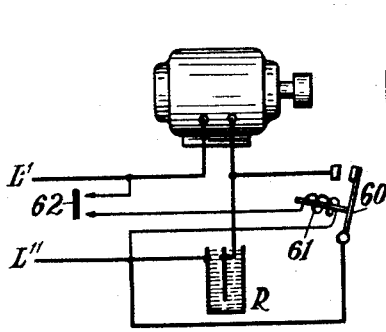
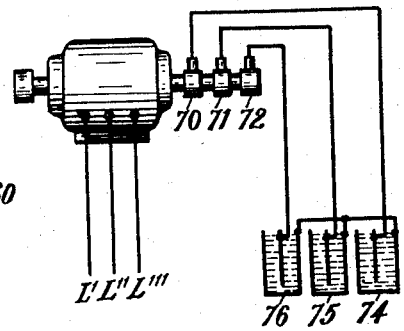
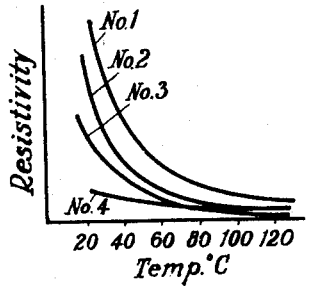
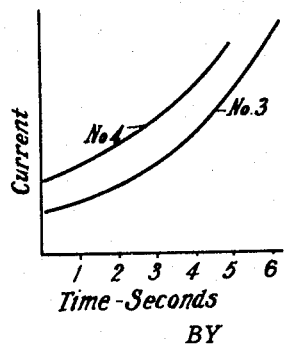

Patented July 26, 1932

1,868,710

UNITED STATES PATENT OFFICE

LEE W. McCULLOUGH, OF YONKERS, NEW YORK

CURRENT CONTROLLING OR REGULATING DEVICE

Application filed August 2, 1929. Serial No. 383,102.

The present invention relates to current controlling or regulating devices and is more particularly directed toward the control of current flow in commercial power and lighting circuits (which employ motors, lights, welding outfits, and analogous translating devices) by resistors having a negative temperature coefficient of resistance.

It is known that the resistance of all metals and of practically all alloys increases with the temperature, i. e. such conductors have a positive temperature coefficient of resistance while the resistance of carbon and practically all electrolytes decreases with increase in temperature which gives them a negative temperature coefficient of resistance. The temperature coefficient of metals is of such a value that the change in resistance within reasonable temperature limits has no application as a current regulating medium and variable resistance has been obtained in the past by causing a movement of parts which varied the amount of resistance in use at any instant, or which varied the contact resistance of numerous elements comprising a unit as a means of changing the overall resistance as for example in a carbon pile rheostat. In the liquid resistance heretofore employed, the negative temperature coefficient of resistance of the electrolyte has not been utilized, the usual method of control being to vary the area of contact surface of the electrodes and the electrolyte so that the desired variation in the amount of resistance in the circuit could be had.

I have, however, discovered that in the use of viscous liquids as the electrolyte of a liquid resistor, such a range in resistance is possible within a convenient range in temperature that such resistors afford a useful means of regulating the flow of current in the circuit in which they are connected. Such resistors function as one way automatic current regulators or controllers in that they permit a steadily increasing current to flow in the circuit in which they are connected by virtue of the temperature rise brought about by the energy loss in the electrolyte. They can be made to decrease the current flow in the circuit by artificially lowering the temperature of the electrolyte thereby providing complete regulation of the current.

The resistance elements may consist essentially of a liquid containing cell or unit having one or more electrodes, depending on the design, immersed in a viscous liquid electrolyte. The container may be one of the electrodes.

They may be designed to absorb a considerable portion of the line potential the instant the circuit in which they are connected is energized, and hence they will be rapidly heated by the energy loss in the electrolyte. This energy loss brings about a rise in the temperature of the electrolyte, which in turn reduces its resistance on account of its having a negative temperature coefficient of resistance. More and more current flows through the cell until the parts have come to a stable condition, or until the current consuming device is operating normally and the current regulating resistance may be shunted out without causing any disturbance on the circuit, or it may remain in circuit and have its temperature regulated. It will thus be seen that such units function automatically as current regulators to the extent that they can be designed to limit the initial flow of current to a given value and permit a steadily increasing current to flow until in a predetermined time the resistor has fulfilled its function and can be shunted from service whereupon it cools off or is artificially cooled to be in readiness for another operating cycle.

The following are some of the advantages of the viscous liquid resistor contemplated by the present invention:

1. It has no moving parts and its change in conductivity is inherent in the resistance itself.
2. It is strictly non-inductive.
3. A unit of given rating may be made in various shapes to suit particular requirements.
4. Units can be made in such sizes as to have any desired hot or cold current rating with a current control range of at least 8 to 1 within a temperature range of 20° C. to 90° C.
5. The available viscous liquid electrolytes include so-called non-freeze solutions such as glycerine and ethylene glycol, hence freezing temperature is not detrimental in the operation of these resistors. It merely increases the time interval required to reach a desired value of current over what it would be with a higher initial temperature.

6. It regulates the starting current of motors, permitting a small initial current which builds up rapidly without interruption until the motor is running at full speed. This method of starting motors is preferred over the use of a starting compensator, fixed resistances or so-called cross the line starters which allow sudden changes of current of considerable magnitude with attendant annoyance due to flickering of lamps supplied from the same or adjacent circuit. This method of starting motors also eliminates vibration and shock caused by starters which permit abrupt changes in the starting current.

7. It embodies a new type of current controller wherein the flow of current may be regulated by controlling the temperature of the electrolyte.

8. It may be used as extremely sensitive elements for determining temperature changes by measuring the change of resistance.

Where automatic variable resistors of the type contemplated by the present invention are employed for motor starting, the present invention also contemplates the provision of suitable means whereby the electrolytic resistor may be shunted after the motor has started so that further energy loss in it may be avoided, and so that it may cool off either naturally or with the assistance of artificial means, so as to be ready for the next motor starting operation.

The accompanying drawings diagrammatically illustrate a type of cell which may be employed as an automatic variable characteristic resistor and show several forms of motor connections by which such a resistor may be employed to control the starting current in a current consuming device, such as a motor.

In these drawings:

Figures 1 and 1a are side elevational and end views of one form of resistor;

Figures 2 and 2a are side elevational and plan views of a modified form of resistor having radiating fins;

Figure 3 is a diagrammatic view showing the resistor with artificial cooling means;

Figures 4 and 4a are views similar to Figures 1 and 1a showing the resistor arranged for circulating the electrolyte;

Figure 5 is a circuit diagram illustrating a motor with an automatic variable resistance for starting purposes, together with a thermal element to actuate a switch which short circuits the resistor and maintains the shunt connection while the circuit is energized;

Figure 6 is a view similar to Figure 5 showing a modified form of thermal arrangement and including an enclosed mercury switch in lieu of bare contacts;

Figure 6a is a fragmentary view of the mercury switch;

Figures 7, 7a and 7b are circuit diagrams, end view and side view showing a centrifugal switch arrangement for short circuiting the resistor;

Figure 8 is a diagrammatic view illustrating the short circuiting of the resistor by a vane operated by air currents created while the motor is in operation;

Figure 9 is a circuit diagram showing a modified thermal circuit control;

Figure 10 is a circuit diagram illustrating the use of an electrically operated circuit breaker or contactor for short circuiting the resistor in cases where large currents are involved;

Figure 11 is a diagrammatic view illustrating the use of the resistor for the speed control of a variable speed induction motor;

Figure 12 is a chart illustrating typical resistivity-temperature curves; and

Figure 13 is a chart illustrating typical current-time curves.

While all viscous liquid electrolytes appear to have a relatively high negative temperature coefficient of resistance as compared with non-viscous solutions, better results seem to be obtained with electrolytes miscible with water, such for example, as various sugar solutions, as honey and molasses, and with glycols, such as ethylene glycol and glycerine. Owing to the anti-freeze properties of ethylene glycol and glycerine, their cheapness and uniformity of composition and stability under various conditions, these materials appear to give the best results. They are miscible with water in all proportions and appear to be capable of being employed with a great many water soluble and solvent soluble salts, weak acids or alkalis.

As representative of solutions of the wide variety which can be prepared employing the viscous liquids and electrolyte forming material, I have chosen, for purposes of illustration, the solutions of common salt in glycerine and ethylene glycol.

In Figure 12, are shown four resistivity-temperature curves. The coordinates start at the zero point of resistivity and temperature. Curve No. 1 shows the resistivity-temperature curve for a solution composed of chemically pure glycerine with 1% saturated solution of common salt. Curve No. 2 shows the resistivity of a similar preparation employing 2% of saturated salt solution. Curve No. 3 indicates the same conditions for a 3% salt solution. Curve No. 4 illustrates the resistivity-temperature curve for a solution of commercial anti-freeze solution (Prestone) containing ethylene glycol together with 1% saturated solution of common salt.

From the curves for the sodium chloride glycerine solution, it will be apparent that within a reasonable range of temperatures, say from room temperature up to 80° C. there is available a marked change in resistance. In the case of the ethylene glycol solution, the change in resistance is very considerable and undoubtedly it will be found to be more marked were one to use a more concentrated solution of ethylene glycol than the commercial anti-freeze solutions available.

Figure 13 indicates the current-time characteristics of a particular resistor as determined when using solutions such as No. 3 and No. 4. The values on the chart start at zero for both current and time. From these it will be apparent that it may take but a few seconds to heat up the electrolyte to a sufficient degree to reduce its resistance to but a small fraction of the resistance at room temperature.

Resistance units using viscous liquid electrolytes may be of various sizes, forms and constructions depending on the conditions under which they are to be used, the time element required, the amount of current to be controlled, radiation, etc. They may consist of any suitable container, such as indicated at 10 in Figures 1 and 1a, having an electrode 11 immersed therein. For convenience, the container is made of conducting material and may constitute the other electrode of the unit. It will of course be understood that a number of plates, rods, pipes, or other devices immersed in the liquid may be employed as electrodes. The container is preferably provided with a filling spout closed, or substantially closed, at the top as indicated at 12. One of the terminals is indicated at 13 as being connected to the case and the other at 14 goes through the case in an insulating bushing.

In Figures 2 and 2a, the container 10 is indicated as having a number of radiating fins 15 for the purpose of more rapidly dissipating the heat generated in the unit.

In Figure 3, the unit 10 is shown as being provided with a thermal element 16 such as a sylphon bellows, or the like which is adapted to actuate a valve 17 to control the flow of a cooling medium about the resistor.

In Figures 4 and 4a, the resistor 10 is indicated as being provided with pipe connections 18 through which the electrolyte may be circulated and externally cooled.

The various forms of resistors described herein may be connected in series with a current consuming device such as a motor wherein it is desirable to control the inrush current. They may be made up in sealed containers or units and permanently associated with the load which they are to control or may be placed elsewhere in the line as desired. From the curves, it will be apparent that when cold, these resistors may have a very high resistance sufficient to materially limit the inrush of current.

Figures 5 to 9 inclusive, show various connections for these resistances wherein the resistor is short circuited after the apparatus has had time to control the starting current for the motor or load. In each of the figures, the resistor is diagrammatically indicated by the reference letter "R" and for convenience it is shown for use in a single phase motor or in the armature current of a D. C. motor. It will, of course, be understood that when used with polyphase circuits, additional resistors will be incorporated in the various legs of the circuit and the group will be designed to function as a multi-pole unit.

In Figure 5, the motor M is shown as being directly connected to the side L' of the line and as being connected to the side L'' of the line through the resistor R. It is, of course, understood that the main starting switch for the motor is omitted from the drawings. In the arrangement shown in Figure 5, a thermal element 20 such as a thermal sylphon is diagrammatically illustrated as being associated with two heating coils 21 and 22. When the sylphon element is cold, the heating element 22 will receive current through the connections 24, 25 and 26. The heating element 21 will also receive current through the connections 27 and 26. The resistance element 22 is designed to have a lower resistance than the element 21 and is arranged to heat up the thermal element at such a rate as to function the switch element 25 by the time the motor is brought up to speed. This thermal element then operates the switch 25 to short circuit the resistor R through the connections indicated at 28 and 29. This will permit the resistor R to cool either naturally or to be cooled artificially as desired. This movement will also disconnect the resistance element 22 from the circuit leaving the resistance element 21 in circuit. Element 21 is a low capacity heating element designed to maintain the thermal element in the expanded position and maintain the short circuit on the resistor R as long as the circuit is energized.

In Figure 6, the circuit arrangement is somewhat the same as in Figure 5. The thermal element in this case, however, is a bi-metallic thermostat 20' carrying a mercury switch 25'. When the thermal element is cold, the mercury switch is in the dotted line position and the circuits for both heating units 21' and 22' are closed. The mercury switch is open in this position. When the line is energized heating units 21' and 22' immediately heat up the thermostat 20' which flexes and opens the circuit of heating unit 22' in going to the position which closes the mercury switch. In this position, the resistor is shunted by the mercury switch through connections 31 and 32. The sustaining heating coil 21′ keeps the thermostat hot which in turn keeps the short circuiting switch closed while the motor is in operation.

In the form of construction indicated in Figure 7, the resistor R is provided with a shunt connected to leads 36 and 37. This shunt is in the form of a centrifugal switch having centrifugal elements such as indicated at 38 which operate against a ring 39 to short circuit the resistors. This centrifugal switch may be of any convenient type, as for example the type commonly used as a speed limit switch for high speed machines.

In the form of construction shown in Figure 8, the motor is provided with a fan 40 adapted to blow air against a vane 41 which operates the circuit closer 42 to shunt the resistor R. This fan 40 may be a fan added to the motor or an air current for operating the vane may be obtained from the ordinary windage of the motor or pulley.

In the arrangement shown in Figure 9, the resistor R is associated with a thermal element 50 having a circuit closing member 51. When the parts are cold, the thermal element is collapsed, the short circuiting contacts are open. When it is heated up, by the heating of the resistor R, the switch element 51 carried by the thermal element engages with three switch points indicated at 52, 53 and 54. This short circuits the resistor R through the connections 55, switch point 53, switch point 52 and connection 56. It also establishes a circuit for the heating coil 57 of an auxiliary thermal element 58 which soon expands and brings a switch closing member 59 against the three contacts corresponding with the contacts 52, 53 and 54. This thermal element 58 therefore maintains circuit connections the same as they were when established by the thermal element 50, thereby holding the circuit connections as they were notwithstanding the fact that the thermal element 50 will now cool off with the resistor R and will move its switch contact 51 away from the fixed contacts.

The arrangements shown in Figures 5 to 9, inclusive, are more particularly intended for fractional horsepower motors wherein the current to be controlled is small. Where, however, the resistor is to be used in conjunction with large motors, the kind of contacts shown in Figures 5 to 9 may not be found satisfactory, and hence resort may be had to an arrangement such as shown in Figure 10 in which the resistor R is short circuited by an electrically operated switch or contactor 60 of any desired capacity. The operating coil 61 is under the control of the master contacts indicated at 62. These master contacts may be connected to any of the devices indicated in Figures 5 to 9 inclusive or closed by any other suitable means.

Figure 11 illustrates the use of the resistors as a two-way current regulator in a circuit arrangement for controlling the speed of a wound secondary variable speed induction motor. Here the collector rings for three phase induction motor (supplied from leads L′, L″, and L‴) are indicated at 70, 71 and 72. These rings are connected to separate resistor elements 74, 75 and 76 made up of the viscous liquid electrolyte of the type above referred to. The resistance of these resistors may be maintained at a desired point by controlling the temperature of the electrolyte either by circulating the electrolyte through an external cooling coil or by directing a cooling medium on the resistors. The speed of this type of motor is regulated by controlling the resistances in the secondary or rotor circuits.

It will, of course, be understood that the resistance elements need not necessarily be disconnected from the circuit. They might, for example, be permanently connected in series with an intermittently operated motor and the resistor would cool off, during the interval when the motor was not running, as for example in an electric refrigerator. Such an arrangement would of course reduce the overall efficiency of the installation because there would be an energy loss in the resistors, but this would avoid the inrush of current to the motor which causes a flicker in house lighting circuits.

It will also be understood that further variation of current may be obtained in the usual manner by varying the area of contact of electrodes and electrolyte by either moving the electrodes or regulating the volume of electrolyte.

What is claimed is:

1. The method of increasing the positive temperature coefficient of conductivity of an electrolyte which comprises mixing small quantities of the electrolyte with a non-conducting viscous liquid.

2. The method of increasing the positive temperature coefficient of conductivity of an aqueous electrolyte which comprises mixing small quantities of the electrolyte with a glycol.

3. In combination with a commercial power or lighting circuit, a resistor comprising a liquid container, a viscous conducting liquid therein having a negative temperature coefficient of resistance, and electrodes immersed in the electrolyte, whereby all current passing through the resistor passes through the electrolyte and heats it, causing its resistance to lessen as the temperature rises and whereby substantial variation in resistance is available with fixed area of contact between the electrodes and electrolyte.

4. The combination as claimed in claim 3, wherein the liquid container serves as one of the electrodes.

5. The combination as claimed in claim 3, wherein the conducting liquid is composed substantially of a viscous liquid to which an electrolyte has been added.

6. The combination as claimed in claim 3, wherein the conducting liquid is composed substantially of glycerine to which a small quantity of an electrolyte has been added.

LEE W. McCULLOUGH.